(12) United States Patent
Cromer et al.

(10) Patent No.: US 7,702,777 B2
(45) Date of Patent: Apr. 20, 2010

(54) CENTRALIZED SOFTWARE MAINTENANCE OF BLADE COMPUTER SYSTEM

(75) Inventors: Daryl C. Cromer, Apex, NC (US); Howard J. Locker, Cary, NC (US); Randall S. Springfield, Chapel Hill, NC (US); Rod D. Waltermann, Durham, NC (US)

(73) Assignee: Lenovo Pte Ltd., Singapore (SG)

( * ) Notice: Subject to any disclaimer, the term of this patent is extended or adjusted under 35 U.S.C. 154(b) by 1019 days.

(21) Appl. No.: 11/024,122

(22) Filed: Dec. 28, 2004

(65) Prior Publication Data

US 2006/0164421 A1 Jul. 27, 2006

(51) Int. Cl.
G06F 15/173 (2006.01)
G06F 15/16 (2006.01)

(52) U.S. Cl. .......... 709/224; 709/217; 709/220; 709/226; 709/229

(58) Field of Classification Search ......... 709/208, 709/217, 220, 223, 224, 226, 229
See application file for complete search history.

(56) References Cited

U.S. PATENT DOCUMENTS

| | | | |
|---|---|---|---|
| 6,269,456 B1 | 7/2001 | Hodges et al. | 714/38 |
| 6,272,536 B1 | 8/2001 | van Hoff et al. | 709/217 |
| 6,421,777 B1 * | 7/2002 | Pierre-Louis et al. | 713/2 |
| 6,434,696 B1 * | 8/2002 | Kang | 713/2 |
| 6,751,658 B1 * | 6/2004 | Haun et al. | 709/222 |
| 7,193,844 B2 * | 3/2007 | Garnett et al. | 361/683 |
| 7,213,065 B2 * | 5/2007 | Watt | 709/223 |
| 2002/0004890 A1 | 1/2002 | Ofek et al. | 711/161 |
| 2002/0156921 A1 | 10/2002 | Dutta et al. | 709/246 |
| 2003/0033399 A1 * | 2/2003 | Garnett et al. | 709/223 |
| 2003/0126242 A1 * | 7/2003 | Chang | 709/222 |
| 2003/0163734 A1 | 8/2003 | Yoshimura et al. | 713/201 |
| 2004/0030773 A1 * | 2/2004 | Espinoza-Ibarra et al. | 709/224 |
| 2004/0054780 A1 * | 3/2004 | Romero | 709/226 |
| 2004/0117414 A1 * | 6/2004 | Braun et al. | 707/204 |
| 2004/0210888 A1 * | 10/2004 | Bergen et al. | 717/168 |

FOREIGN PATENT DOCUMENTS

JP 11-095989 4/1999

OTHER PUBLICATIONS

"Automated Virus Protection Software Without Noticeable System Overhead," IBM Technical Disclosure Bulletin, vol. 36, No. 10, p. 383 (1993).

* cited by examiner

Primary Examiner—Moustafa M Meky
Assistant Examiner—Farzana Huq
(74) Attorney, Agent, or Firm—Fox Rothschild LLP

(57) ABSTRACT

A method and system are disclosed in which a management module (MM) designates an idle blade in a client blade farm to be an "administrative blade" that has administrator access to the virtual images of all users. The MM identifies when a particular user image is, or is not, in use and conveys this information to the administrative blade. The administrative blade performs virus scans, backups, defrags, patch installs, software upgrades, and other such maintenance functions on user images when they are inactive, thereby eliminating the performance impact to active users.

9 Claims, 3 Drawing Sheets

CENTRALIZED SOFTWARE MAINTENANCE OF BLADE COMPUTER SYSTEM

BACKGROUND OF THE INVENTION

1. Field of the Invention

This invention relates to management of the maintenance activities in a blade computing system.

2. Description of the Related Art

In the past, information handling systems, e.g., workstations, servers, etc. were essentially self-contained systems within an appropriate housing. For example, a desktop PC would consist of user interface elements (keyboard, mouse, and display) and a tower or desktop housing containing the CPU, power supply, communications components and the like. However, as demands on server systems and PC systems increased and with the increasing spread of networks and the services available through networks, alternate technologies have been proposed and implemented.

Blade computing is one such technology. A blade server provides functionality comparable to or beyond that previously available in a "free standing" or self-contained server, by housing a plurality of information handling systems in a compact space and a common housing. Each server system is configured to be present in a compact package known as a blade, which can be inserted in a chassis along with a number of other blades. At least some services for the blades, typically power supply, are consolidated so that the services can be shared among the blades housed in common. As blade technology has advanced, blade architecture has been developed whereby servers are packaged as single boards and designed to be housed in chassis that provide access to all shared services. In other words, blade servers today are single board units that slide into a slot in a housing in which other like boards are also housed.

While blade server technology changed the way in which servers were utilized and managed, on the client side (e.g., at the desktop level), things remained essentially the same. That is, each workstation still consisted of a desktop PC coupled, wirelessly or via Ethernet cables, to the "server farm" where the blade servers were stored. However, the next logical progression of blade technology was then applied to PCs, resulting in the "desktop blade".

Similar to server blades, desktop blades involve the configuration of the major components of a PC onto a single card, and then storing/housing many such cards in a single chassis or housing. This allowed the moving of the processing power of the PC into a single location, leaving the workstation user with simply a keyboard, mouse, monitor, and a deskside device (a network port device such as a thin client, fat client, etc.) on the desktop. The deskside device connected the keyboard, mouse and monitor to the desktop blades via standard networking devices/cables, freeing up space in the user's work area.

The use of desktop blades allows centralized management and maintenance of the PC hardware, and enables sharing of hardware so that, for example, an organization with 1,000 employees, but that on the average day has only 900 employees accessing/utilizing PC assets, can choose to purchase and maintain only 900 desktop blades instead of requiring that there be one available for each employee, whether they are present or not. The desktop blades are stateless and are allocated to employees when they log on to the system. Since the desktop blades can be used by different users at different times, each employee's user image is stored off the blade, e.g., in a hard drive separate from the blade, and a log-on management console tool or management module (MM) allocates the blade and directs the blade to the appropriate partition in the storage location where the user's image is stored.

As in all computer systems, in blade systems, virus scans, data backups, and the like are critical to ensure that client machines are not infected and critical data is saved. A problem exists, however, because virus scans and data backups significantly affect the performance of the devices being maintained. Typically, IT administrators have a set time during which they run maintenance activities such as virus scans and backups on the stored user image. While this system functions adequately, it would be desirable to have the ability to easily and automatically perform these maintenance functions at any time that a particular user image is idle.

Accordingly, it would be desirable to have a desktop blade system whereby maintenance activities can be centralized, and take advantage of available unallocated blades to perform the maintenance functions.

SUMMARY OF THE INVENTION

The present invention provides a method and system in which a management module (MM) that designates an idle blade in a client blade farm to be an "administrative blade" that has administrator access to the virtual images of all users. The MM identifies when a particular user image is, or is not, in use and conveys this information to the administrative blade. The administrative blade performs virus scans, backups, defrags, patch installs, software upgrades, and other such maintenance functions on user images when they are inactive, thereby eliminating the performance impact to active users.

DETAILED DESCRIPTION OF THE PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
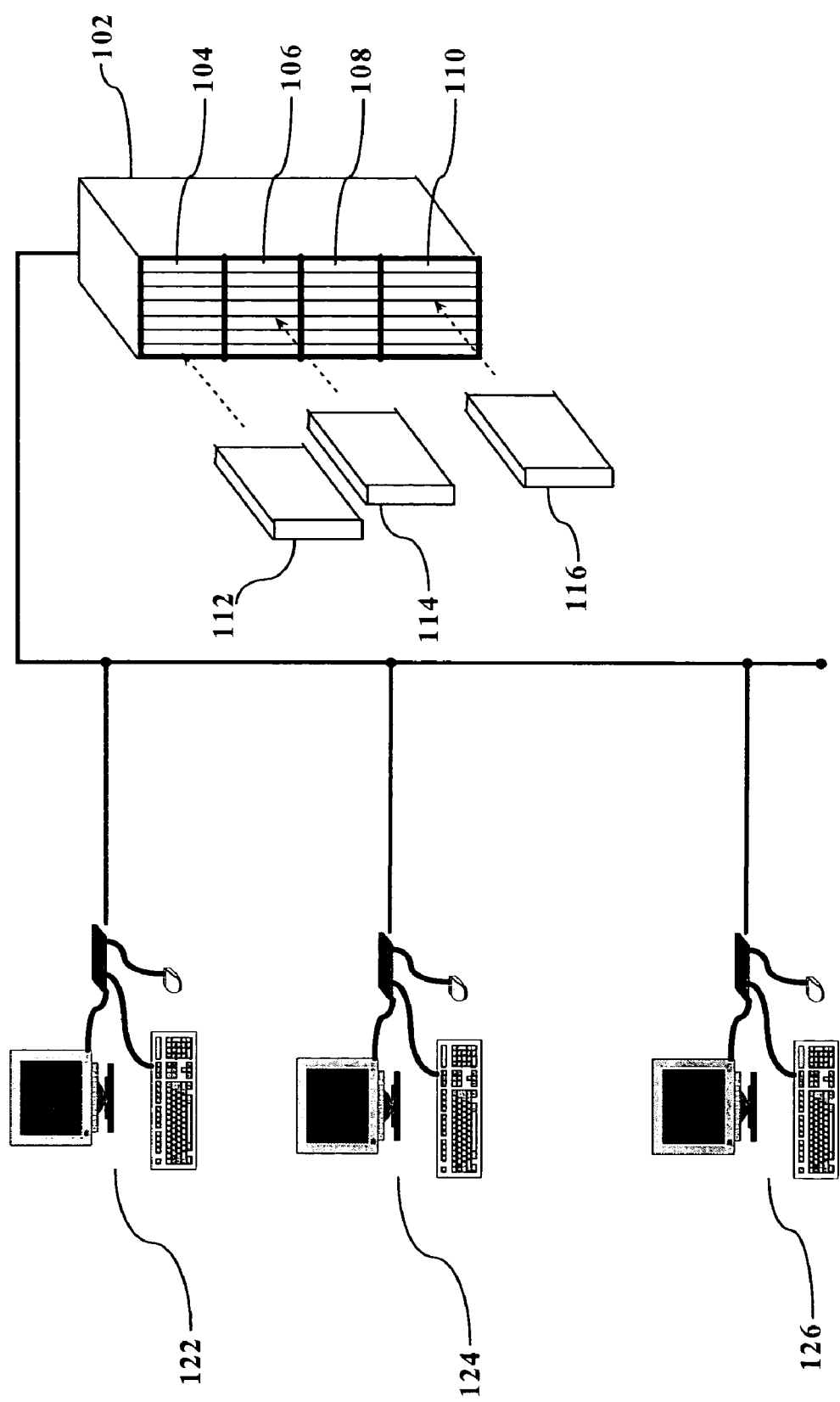
FIG. 1 illustrates an exemplary blade environment in which both desktop blades and blade servers are utilized.

Referring now more particularly to the drawings, FIG. 1 illustrates an exemplary blade environment in which both desktop blades and blade servers are utilized. While the view is simplified and certain elements to be described herein are not visible in FIG. 1, the apparatus is shown to have a rack housing 102 in which are situated a plurality of chassis 104, 106, 108, and 110. Within the chassis, multiple blades, e.g., blades 112, 114, and 116, can be mounted. For example, in FIG. 1, blade 112 is illustrated as being mounted in chassis 104; blade 114 is shown as being mounted in chassis 106, and blade 116 is shown being mounted in chassis 110.

The blades illustrated in FIG. 1 are shown withdrawn from their respective chassis, with an indication that the blades may be inserted into the chassis. In a preferred embodiment, any type of blades can be stored in rack housing 102 and utilized by users via workstations (described below) as needed. For example, blade 112 can be a desktop blade, blade 114 can be a server blade, and blade 116 can be a storage blade (a blade devoted to storage space). It is understood that multiple rack housings may be used to, for example, keep all desktop blades in one rack, all server blades in another rack, and all storage blades in a different rack. However, from a performance viewpoint, it is preferable to have at least a set of desktop blades and the storage blade on which their images are stored all housed in the same rack. It is also understood that an external server can also be used as a storage device instead of, or in addition to, a storage blade.

The rack housing 102 may also house a MM (not shown) for managing the flow of data to and from the blades, as well as to storage locations such as hard drives, ROM and the like. It is understood that, while a single rack housing 102 is illustrated, multiple rack housings may be interconnected in a single "blade center" and operate as essentially one chassis as shown. Further, although not shown, common elements, such as power supplies, an MM, cooling fans, etc. may also be included in rack housing 102.

Connected to rack housing 102 are workstations 122, 124, and 126. It is understood that although only three workstations are shown in FIG. 1, a single workstation or many more than three workstations may be attached to rack housing 102 in the manner shown in FIG. 1. In a typical desktop blade setup, the connection between workstations 122, 124, 126, and rack housing 102 is via an Ethernet connection. It is understood that any method of connecting the desktop stations to the blades in the rack housing may be utilized.

Workstations in a blade environment typically comprise a display device (e.g., a CRT) and user interface devices such as a keyboard and mouse. A deskside device (a network port device, such as a "thin client", fat client, etc.) connects the keyboard, mouse and monitor to the desktop blades. The deskside device extracts video data from the signal it receives from the desktop blade via the Ethernet connection and drives the display with this video data. In addition, the desktop device takes keyboard and mouse input, packetizes it, and transmits it over the Ethernet connection to the desktop blade in rack housing 102.

In a typical desktop blade system such as that shown in FIG. 1, when a user logs on at a workstation, e.g., at workstation 122, that user will activate a log-on process whereby they identify themselves to the system and "request" the allocation of a blade to them for use. It is understood that this request is essentially transparent, i.e., the user does not have to specifically submit a request for the blade, but instead, the act of logging on indicates to the system that the user is in need of a blade for use. Upon providing identifying information to the system, an MM (or a discrete server on the Ethernet configured for the same purpose) allocates a blade to the user and identifies the location where the user's user image is stored, e.g., on storage blade 116. The user's user image is then directed to the particular workstation where the user is logging on, essentially bringing the user back to the state that he or she was in when they logged off. It is understood that the term "log-off" includes an active log-off, whereby the user signs off the system, as well as a passive log-off, for example, when the user ceases of the system for a predetermined period of time, thereby placing the desktop workstation in a "hibernation" mode or other essentially-suspended state. Thus, a first user of a desktop blade system such as that illustrated in FIG. 1 logs off the system (or is logged off), thereby releasing the blade that was being used at the time for use by a second user. When the first user logs back on again, a different blade is allocated to the first user, and they are returned to essentially the same place they were when they logged off.

In order to achieve this reinstatement of the user image, upon logging off the system, the blade system of the prior art stores the entire user image of the user in an off-blade location (i.e., off the particular desktop blade) such as a storage blade or other memory storage device.

Figure 2:
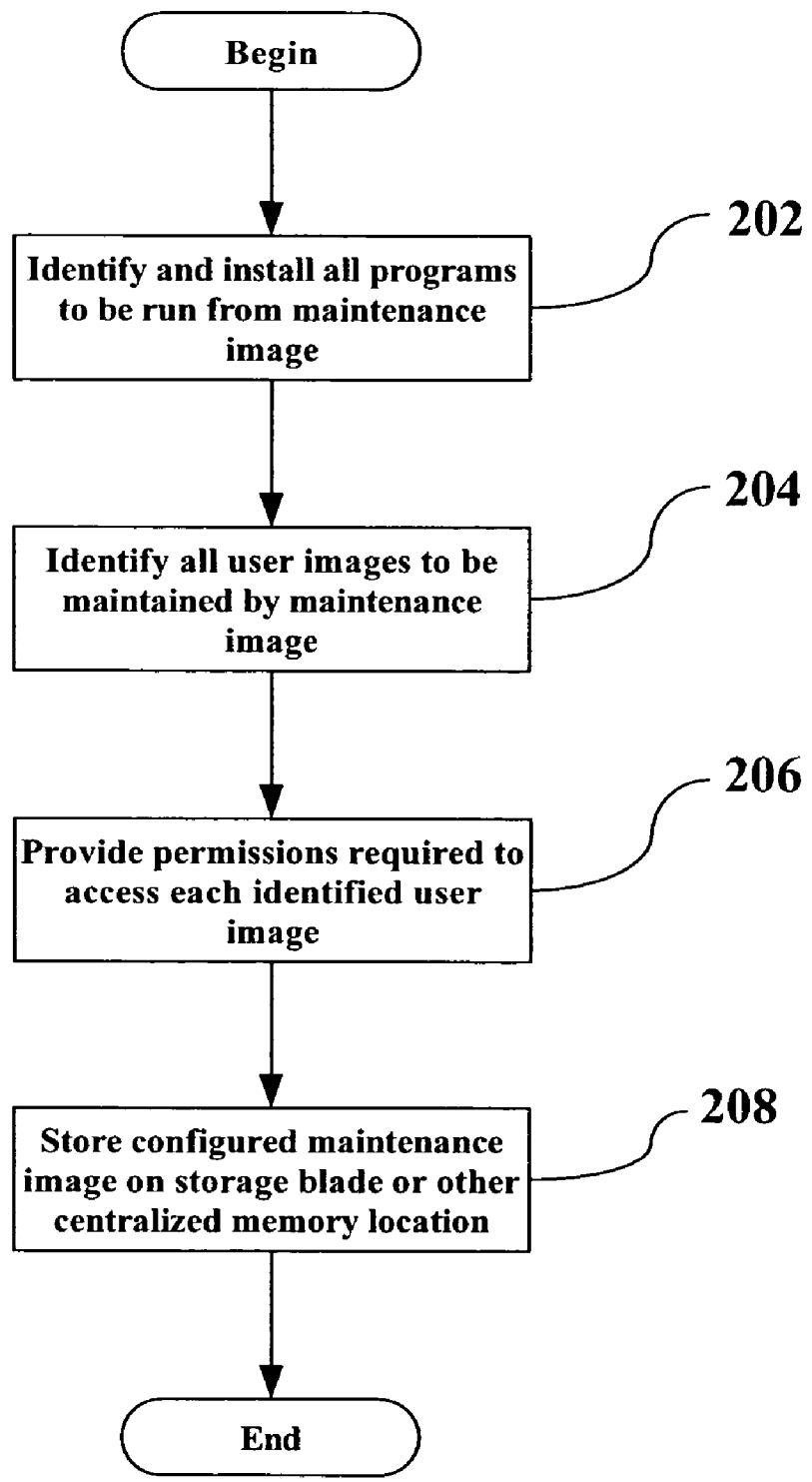
FIG. 2 is a flowchart illustrating the process of creating a maintenance image in accordance with the present invention.

FIG. 2 is a flowchart illustrating the process of creating a maintenance image in accordance with the present invention. Referring to FIG. 2, the process begins by the identification and installation of all programs to be run from the maintenance image. For example, the maintenance image may be used to deploy and run a virus scan, a defragmentation program, patch installs, software upgrades, and a backup program. Obviously any other maintenance programs that would normally be run on a computer system can be included as part of the maintenance image, and the programs listed above are listed merely for the purpose of example. This maintenance image is a fully bootable image and any desktop blade is capable of booting from this image. Once finished, this image is stored on the storage blade or other memory storage device.

At step 204, an identification is made of all user images to be maintained by the maintenance image. Each blade center has an MM that runs control software that controls resource assignment. This MM (which can also be a remote management console on a different server) maintains a list of all authorized users and a list of which users are currently active. The MM also is capable of checking to determine which blades in the blade center are being used and which items on the maintenance image have been successfully performed for each user image, so it can be known when a particular maintenance item has or has not been performed on a particular user image. Additional operations capable of being performed by the MM are discussed below with reference to FIG. 3.

To maintain the list of all authorized users, the MM keeps a listing of the exact location on a storage blade that each user image begins and ends using, for example, a logical address relationship (LAR). These locations are associated with a particular maintenance image for use in identifying the user images to be maintained.

At step 206, the appropriate permissions required to access each identified user image are also stored on the maintenance image. This allows the maintenance image to be utilized to access each of the user images when it is time to maintain them.

At step 208, the now configured maintenance image is stored on the storage blade associated with the particular blade center, or at another centralized memory location as desired.

Figure 3:
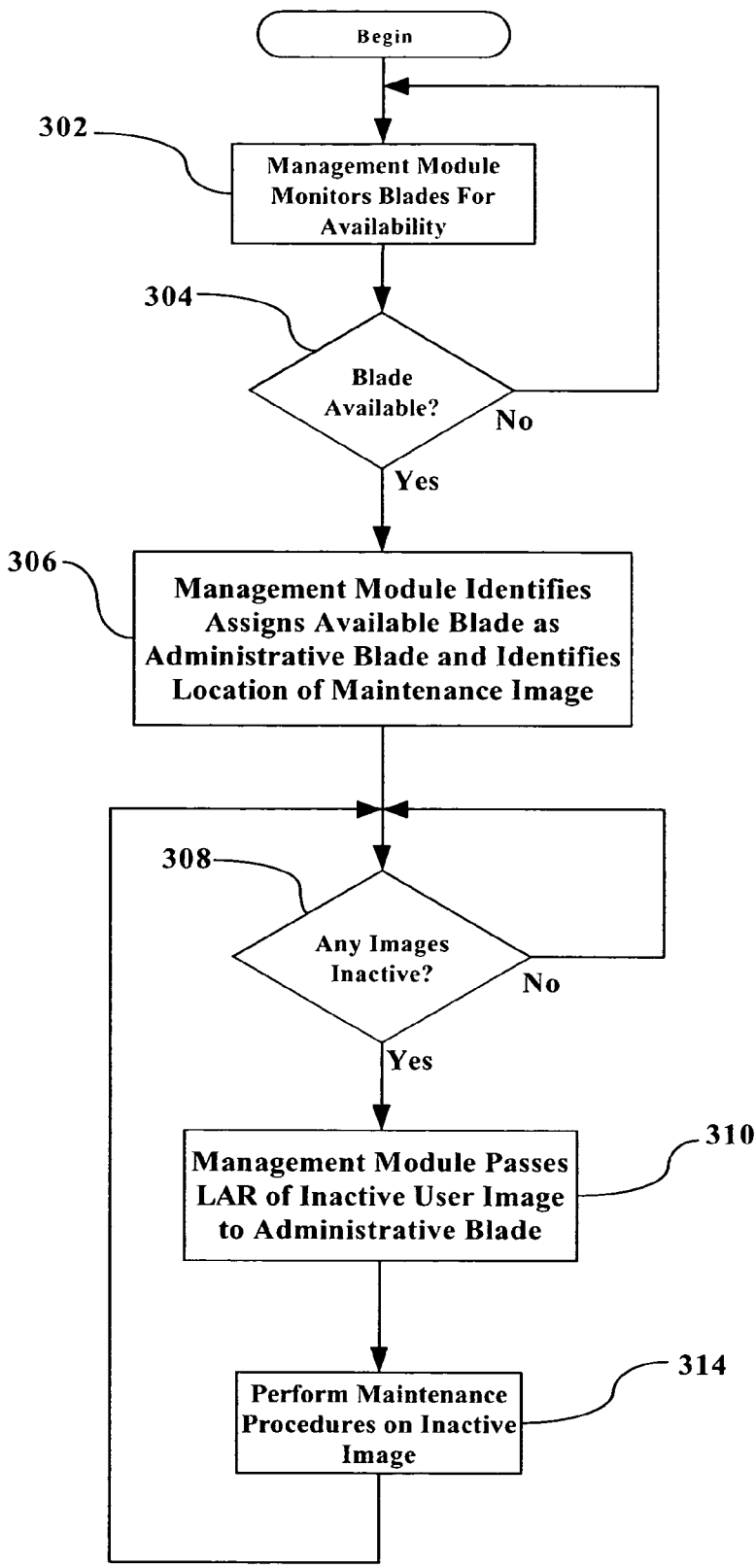
FIG. 3 is a flowchart illustrating the process of using the maintenance image in accordance with the present invention.

FIG. 3 is a flowchart illustrating the process of using the maintenance image in accordance with the present invention. Referring to FIG. 3, at step 302, the MM monitors all blades under its control for availability. At step 304, a determination is made as to whether or not there is a blade available for use. If not, the process proceeds back to step 302 where the MM continues to monitor blades for availability.

If, at step 304, it is determined that a blade is available to use as the administrative blade, then at step 306, the MM assigns the available blade as the "administrative blade" and identifies to the administrative blade the location of the stored maintenance image which will be used to perform the maintenance activities.

At step 308, a determination is made as to whether or not there are any inactive images. It is preferable to run maintenance activities on inactive user images, so that the users of the active images are not disturbed or subjected to delays during their use of the image.

If, at step 308, there are no images found to be inactive, the process proceeds back to step 308, i.e., it loops, to continue to monitor the activity of the user images. It is understood that, if desired, active user images can also be subjected to the maintenance activities controlled by the maintenance image. If desired, multiple sets of maintenance activity schedules can be prepared, so that, for example, a slimmed down version can be utilized for providing maintenance activities on active user images, thereby minimizing the disruption to the user.

If, at step 308, it is determined that there are inactive user images, the process proceeds to step 310, where the MM passes the location information (e.g., the LAR) of the inactive user image to the administrative blade, and at step 314, the maintenance procedures available by the administrative image are performed on the inactive user image. The process then proceeds back to step 308 to determine if there are any additional inactive images. This looping process can continue indefinitely, thereby providing a constant monitoring of the user images and constant performance of maintenance activities on the inactive user images as they become inactive.

The monitoring and maintaining process can, of course, be terminated by any known method of terminating a maintenance loop. Methods for terminating the process will be readily apparent to those of ordinary skill in the art and are not mentioned herein.

The MM has the ability to control many aspects of the operation of the present invention. For example, the MM can force a maintenance action without waiting for a free blade and/or an inactive user image if it is deemed to be so important that it would not be desirable to wait for these or other conditions to present themselves. This can be done by forcing a user of a blade off the system to free up a blade and/or performing operations on an image currently being used. The MM decides when the time is right to run this maintenance image, obtains a free blade, assigns the free blade as the administrative blade, and passes a list of user images available to receive maintenance activity, as well as the specific maintenance activities to be performed on each image.

The present invention, via the management module, can also suspend and/or terminate maintenance activities when needed, so as to free up the administrative blade for use by a system user and/or to "give back" a user image to a user who is attempting to log onto the system. The MM keeps track of which elements of the user image have been subjected to maintenance activity and which have not, so that upon resumption of maintenance on that particular user image, only the unperformed maintenance functions need be performed.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage on a disk drive located in a rack housing. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, FIGS. 2-4 support combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method for centralized software maintenance of user disk images stored on a blade computing system comprising blades configured to run the user disk images, the method comprising:
   creating a maintenance image, including: identifying and installing one or more of a virus scan program, a patch install program, a software upgrade program, a defragmentation program, and a backup program to be run from the maintenance image and identifying the user disk images to be maintained by the maintenance image;
   storing the maintenance image on a storage blade or at another centralized memory location;
   monitoring the blades configured to run the user disk images until one or more inactive blades are identified;
   designating one of the inactive blades as an administrative blade;
   monitoring the user disk images until one or more inactive user disk images are identified;
   providing location information for the one or more inactive user disk images to the administrative blade; and
   activating the administrative blade and running the maintenance image on said administrative blade to perform one or more of a virus scan, a patch install, a software upgrade, defragmentation, and a data backup on the one or more inactive user disk images.

2. The method of claim 1, further comprising: prohibiting each user disk image on which said one or more of a virus scan, a patch install, a software upgrade, defragmentation, and a data backup are being performed from being used by a system user attempting to log onto the blade computing system during the performance of said one or more of a virus scan, a patch install, a software upgrade, and defragmentation, a data backup.

3. The method of claim 2, wherein when said designated administrative blade is needed to perform functions other than said one or more of a virus scan, a patch install, a software upgrade, defragmentation, and a data backup, said designation of said designated administrative blade as said administrative blade is removed to free up said blade for other uses.

4. A system for centralized software maintenance of user disk images in a blade computing system comprising blades configured to run the user disk images, the system comprising:
- means for creating a maintenance image, including identifying and installing one or more of a virus scan program, a patch install program, a software upgrade program, a defragmentation program, and a backup program to be run from the maintenance image and identifying the user disk images to be maintained by the maintenance image;
- means for storing the maintenance image on a storage blade or at another centralized memory location;
- means for monitoring the blades configured to run the user disk images until one or more inactive blades are identified;
- means for designating one of the inactive blades as an administrative blade;
- means for monitoring the user disk images until one or more inactive user disk images are identified;
- means for providing location information for the one or more inactive user disk images to the administrative blade; and
- means for activating the administrative blade and running the maintenance image on said administrative blade to perform one or more of a virus scan, a patch install, a software upgrade, defragmentation, and a data backup on the one or more inactive user disk images.

5. The system of claim 4, further comprising: means for prohibiting each user disk image on which said one or more of a virus scan, a patch install, a software upgrade, defragmentation, and a data backup are being performed from being used by a system user attempting to log onto the blade computing system during the performance of said one or more of a virus scan, a patch install, a software upgrade, defragmentation, and a data backup.

6. The system of claim 5, wherein when said designated administrative blade is needed to perform functions other than said one or more of a virus scan, a patch install, a software upgrade, defragmentation, and a data backup, said designation of said designated administrative blade as said administrative blade is removed to free up said blade for other uses.

7. A computer program product for centralized software maintenance of user disk images in a blade computing system comprising blades configured to run the user disk images, the computer program product comprising a computer-readable storage medium having computer-readable program code embodied in the medium, the computer-readable program code comprising:
- computer-readable program code that creates a maintenance image, including identifying and installing one or more of a virus scan program, a patch install program, a software upgrade program, a defragmentation program, and a backup program to be run from the maintenance image and identifying the user disk images to be maintained by the maintenance image;
- computer-readable program code that stores the maintenance image on a storage blade or at another centralized memory location;
- computer-readable program code that monitors the blades configured to run the user disk images until one or more inactive blades are identified;
- computer-readable program code that designates one of the inactive blades as an administrative blade;
- computer-readable program code that monitors the user disk images until one or more inactive user disk images are identified;
- computer-readable program code that provides location information for the one or more inactive user disk images to the administrative blade; and
- computer-readable program code that activates the administrative blade and runs the maintenance image on said administrative blade to perform one or more of a virus scan, a patch install, a software upgrade, defragmentation, and a data backup on the one or more inactive user disk images.

8. The computer program product of claim 7, further comprising: computer-readable program code that prohibits each user disk image on which said one or more of a virus scan, a patch install, a software upgrade, defragmentation, and a data backup are being performed from being used by a system user attempting to log onto the blade computing system during the performance of said one or more of a virus scan, a patch install, a software upgrade, defragmentation, and a data backup.

9. The computer program product of claim 8, wherein when said designated administrative blade is needed to perform functions other than said one or more of a virus scan, a patch install, a software upgrade, defragmentation, and a data backup, said designation of said designated administrative blade as said administrative blade is removed to free up said blade for other uses.

* * * * *